(12) United States Patent
Neuffer et al.

(10) Patent No.: US 9,127,804 B2
(45) Date of Patent: Sep. 8, 2015

(54) HOLDING DEVICE FOR STORING HOLDING RODS ON A CRANE

(71) Applicant: Liebherr-Werk Nenzing GmbH, Nenzing (AT)

(72) Inventors: Heinz Neuffer, Bregenz (AT); Richard Torghele, Bartholomaeberg (AT)

(73) Assignee: Liebherr-Werk Nenzing GmbH, Nenzing (AU)

( * ) Notice: Subject to any disclaimer, the term of this patent is extended or adjusted under 35 U.S.C. 154(b) by 4 days.

(21) Appl. No.: 14/218,674

(22) Filed: Mar. 18, 2014

(65) Prior Publication Data

US 2014/0284364 A1    Sep. 25, 2014

(30) Foreign Application Priority Data

Mar. 20, 2013   (DE) .......................... 10 2013 004 820

(51) Int. Cl.
| | |
|---|---|
| B60R 9/045 | (2006.01) |
| F16M 13/02 | (2006.01) |
| B66C 23/62 | (2006.01) |
| B66C 23/82 | (2006.01) |
| B60R 9/048 | (2006.01) |
| B60R 11/00 | (2006.01) |

(52) U.S. Cl.
CPC .............. *F16M 13/02* (2013.01); *B66C 23/62* (2013.01); *B66C 23/823* (2013.01); *B60R 9/045* (2013.01); *B60R 9/048* (2013.01); *B60R 2011/008* (2013.01)

(58) Field of Classification Search
CPC ................. B66C 23/00; B66C 23/82–23/828; B60R 2011/008; B60R 2011/0082; B60R 9/045; B60R 9/048
USPC ......... 224/441–462, 501, 527, 529–530, 532, 224/545–571, 42.39; 248/49, 65, 67.5, 248/67.7, 68.1, 69, 70, 72, 73, 73.3, 248/74.3–74.5; 403/293, 341, 385, 392, 403/394, 400

See application file for complete search history.

(56) References Cited

U.S. PATENT DOCUMENTS

| | | | | |
|---|---|---|---|---|
| 3,240,455 | A | * | 3/1966 | Montgomery et al. ........ 248/539 |
| 3,380,698 | A | * | 4/1968 | Goldberg et al. ......... 248/229.26 |
| 4,097,012 | A | * | 6/1978 | McIntyre ....................... 248/674 |

(Continued)

FOREIGN PATENT DOCUMENTS

| | | |
|---|---|---|
| DE | 202011002674 U1 | 5/2012 |
| DE | 202012102532 U1 | 8/2012 |

*Primary Examiner* — Justin Larson
*Assistant Examiner* — Scott McNurlen
(74) *Attorney, Agent, or Firm* — Alleman Hall McCoy Russell & Tuttle LLP

(57) ABSTRACT

The present disclosure relates to a holding device for storing holding rods on a crane, with at least two holders, at least one securing piece and at least one lock, wherein the at least two holders comprise at least one toothed connecting surface each and at least four lead-throughs each, at least one of which each is designed as oblong hole. According to the present disclosure, the at least two holders are connectable with each other via a connector through the one oblong hole each and are connectable with the crane through at least one further lead-through each, wherein the at least two holders together comprise a common U-shaped deposition region for accommodating and horizontally fixing holding rods, and wherein the holding rods are vertically fixable by means of the at least one securing piece and the at least one lock inside the U-shaped deposition region.

20 Claims, 6 Drawing Sheets

(56) References Cited

U.S. PATENT DOCUMENTS

| | | | |
|---|---|---|---|
| 5,029,785 A * | 7/1991 | Besong, Jr. | 248/205.1 |
| 5,582,044 A * | 12/1996 | Bolich | 70/58 |
| 7,337,934 B2 * | 3/2008 | Alling et al. | 224/401 |
| 8,672,199 B1 * | 3/2014 | Ditore et al. | 224/411 |
| 8,820,686 B2 * | 9/2014 | Hickle et al. | 248/65 |
| 2001/0042766 A1 * | 11/2001 | Ming-Shun | 224/324 |
| 2010/0294735 A1 * | 11/2010 | Walker et al. | 212/232 |
| 2012/0175333 A1 * | 7/2012 | Pech et al. | 212/177 |

\* cited by examiner

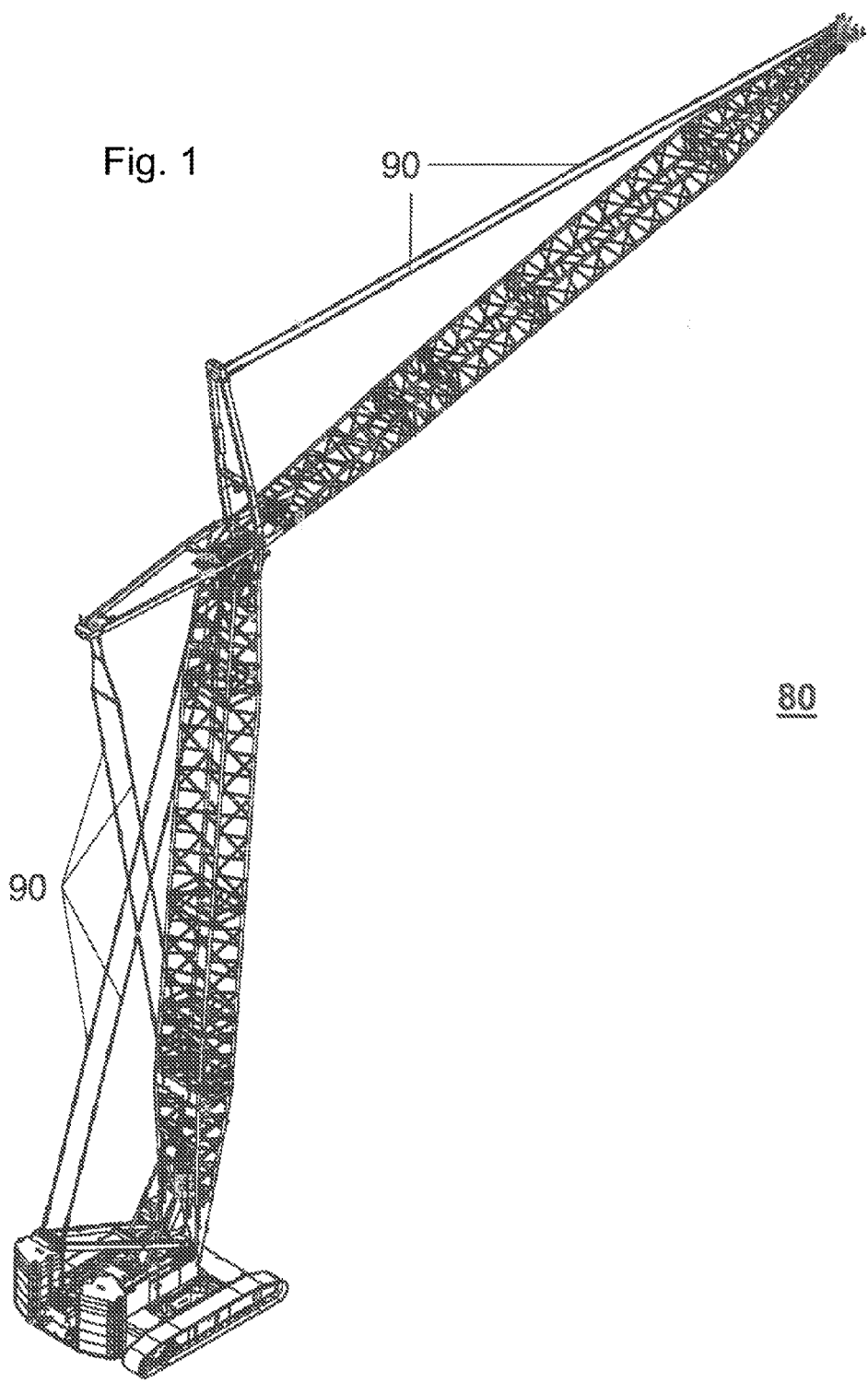

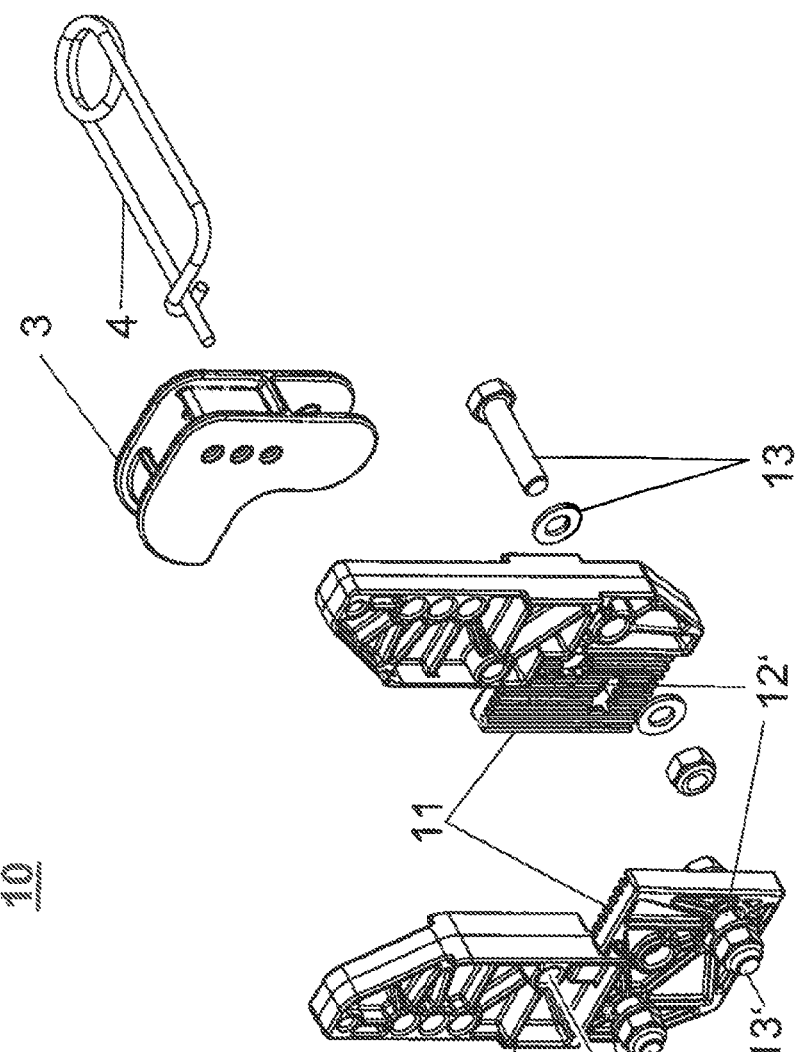
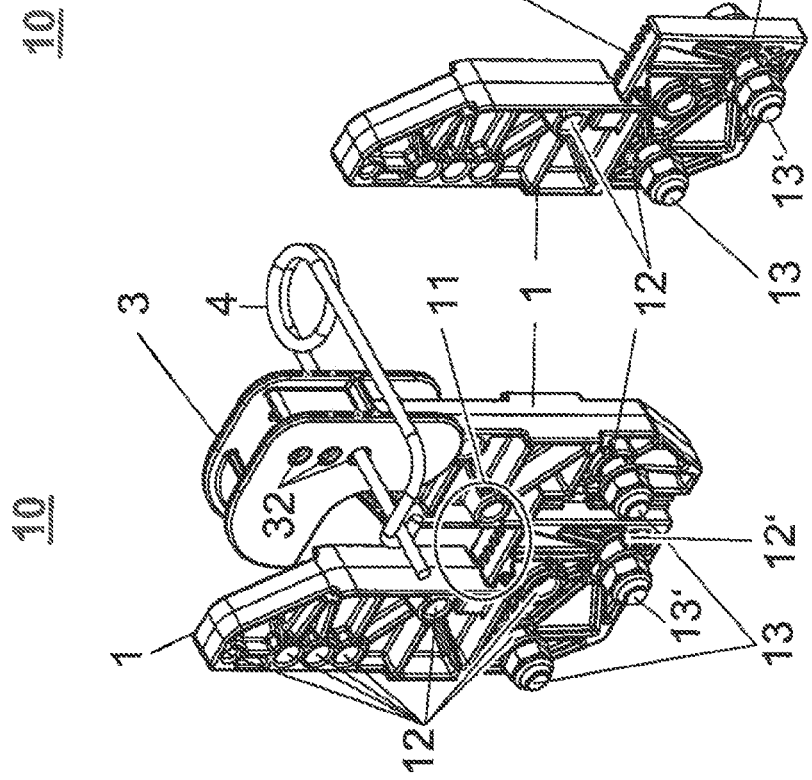

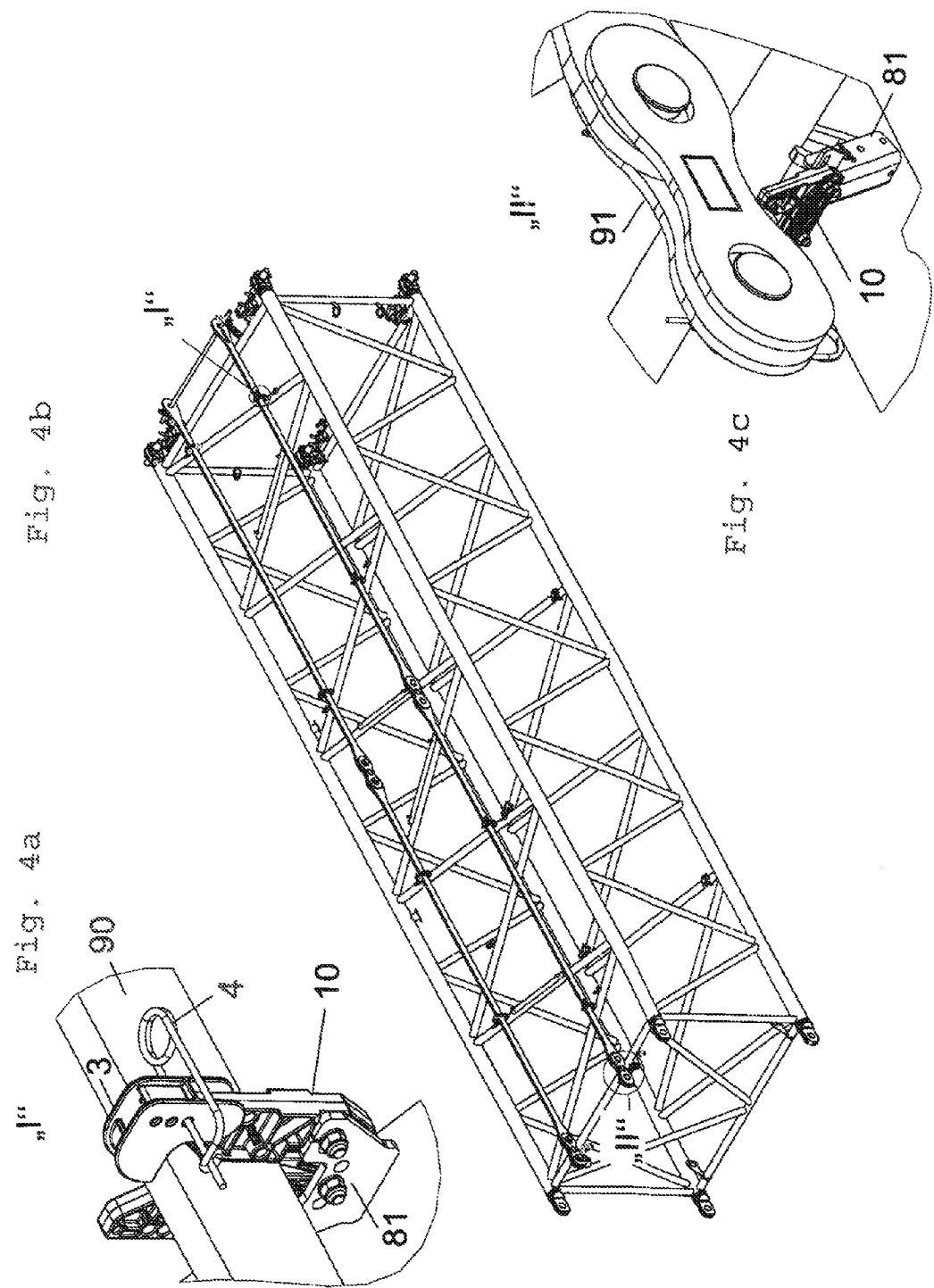

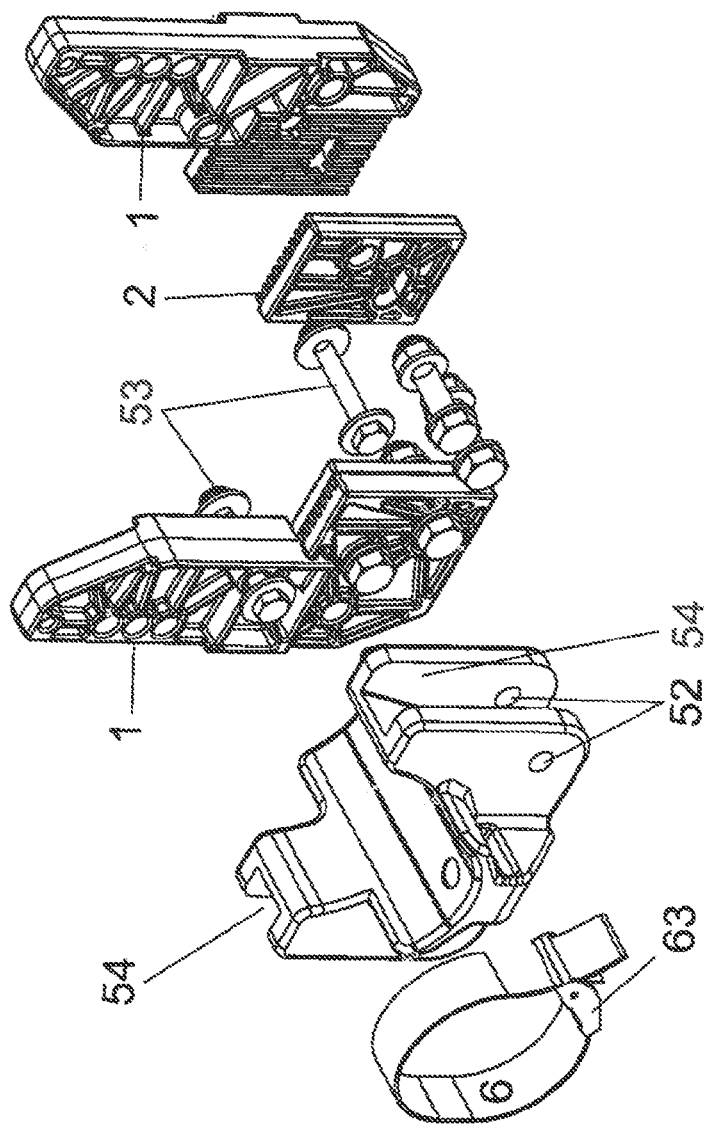
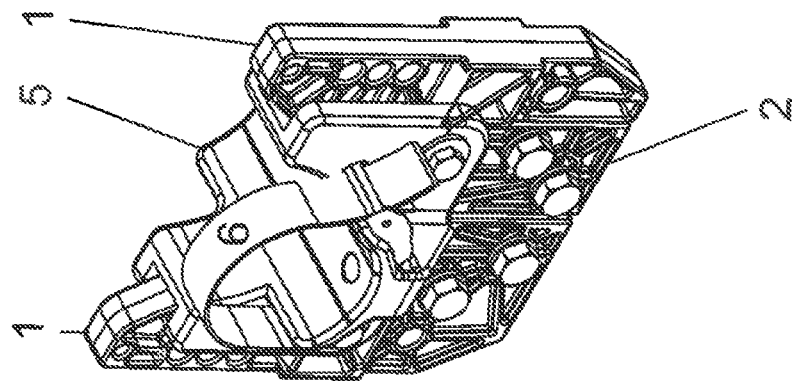
Fig. 5b
Fig. 5a

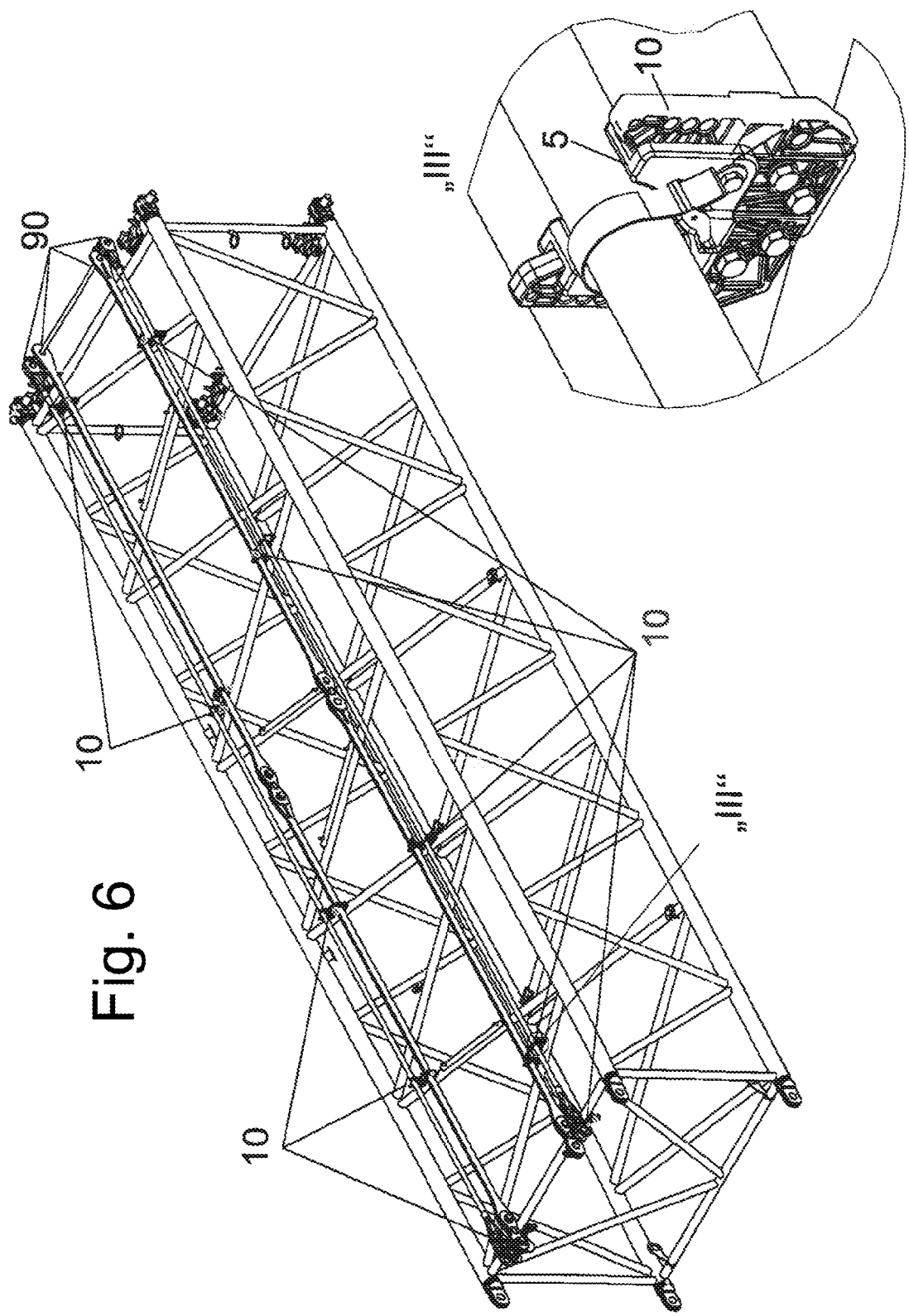

US 9,127,804 B2

HOLDING DEVICE FOR STORING HOLDING RODS ON A CRANE

CROSS REFERENCE TO RELATED APPLICATION

This application claims priority to German Patent Application No. 10 2013 004 820.6, entitled "Holding Device for Storing Holding Rods on a Crane," filed Mar. 20, 2013, which is hereby incorporated by reference in its entirety for all purposes.

TECHNICAL FIELD

The present disclosure relates to a holding device for storing holding rods on a crane, additional devices therefor, as well as a set of a holding rod and a plurality of holding devices.

BACKGROUND AND SUMMARY

Holding devices for storing holding rods on cranes are known from the prior art. They serve to store and secure holding rods made of steel or of CFRP (carbon fiber reinforced plastic), possibly also together with coupling tabs, during the crane operation, transport or in the deposition or parking position of the crane or the crane boom, respectively. It is known to design the holding devices with variable geometry, in order to provide for storing and securing parts which have different dimensions.

It is known that the holding devices are fixed at crane structures such as boom portions, or at special brackets provided at the crane structures, so that holding rods are connectable with the crane structures directly via the holding devices. By storing the holding rods on the crane structures, it can be ensured among other things that the holding rods ideally are stored close to the regions in which they are required or are present in the fully equipped condition of the crane. Due to the use of already existing crane structures, otherwise possibly necessary additional holding devices for storing the holding rods also are omitted.

It happens that holding rods slip in the holding device during storage in their storage position. This leads to damages of the paintwork of the holding rods and the boom.

Therefore, it is the object of the present disclosure to provide a holding device for storing holding rods on a crane, by which an improved storage of the holding rods on the crane becomes possible.

According to the present disclosure, this object is solved by a holding device for storing holding rods on a crane with at least two holders, at least one securing piece and at least one lock, wherein the at least two holders comprise at least one toothed connecting surface each and at least four lead-throughs each, at least one of which each is designed as an oblong hole, wherein the at least two holders are connectable with each other via a connecting means, such as a connector, through the one oblong hole each and are connectable with the crane through at least one further lead-through each, wherein the at least two holders together comprise a common U-shaped deposition region for accommodating and horizontally fixing holding rods, and wherein the holding rods are vertically fixable inside the U-shaped deposition region by means of the at least one securing piece and the at least one lock. The connector may include, for example, a screw.

Advantageously, a variable adjustment of the two holders can become possible by the oblong hole, whereby holding rods of different dimensions can be stored on the crane by means of the same holding device. Thus, turning apart of the at least two holders relative to each other or relative to the crane due to too high a load advantageously becomes difficult.

The use of an additional securing piece likewise is advantageous. In an unfavorable storage condition, a holding rod therefore still cannot endanger the paintwork.

In one example embodiment, the at least two holders can be brought in positive connection with each other via the at least one toothed connecting surface each, wherein the at least two oblong holes of the at least two holders at least partly overlap each other.

In this way, it can advantageously be ensured that a power or moment transmission between the two holders is possible via the toothed connecting surfaces. In addition, the overlap of the oblong holes ensures that a connecting means, such as a connector, can be passed through the oblong holes and possibly can also be connected with the crane.

In one particular embodiment, the at least one oblong hole of each of the at least two holders is provided in the region of the toothed connecting surfaces.

Such placement of each of the at least one oblong hole advantageously provides for connecting the two toothed connecting surfaces with each other by the connector and at the same time apply a pressing force. The positive connection of the toothed connecting surfaces is supported by non-positive connection and breaking up of the positive connection due to torsional forces, for example, is counteracted.

In a further example, at least two filler pieces, each with at least one toothed connecting surface and at least one lead-through designed as an oblong hole are provided, wherein each filler piece can be brought in positive connection with one holder via the toothed connecting surfaces of holder and the toothed connecting surfaces of the filler piece, wherein the oblong holes of the holders and the oblong holes of the filler pieces at least partly overlap each other, and wherein the total of at least two holders and at least two filler pieces are connectable with each other and/or with the crane by a total of at least four lead-throughs.

Such an embodiment advantageously provides for adjusting a larger distance between the holders by connecting the filler pieces with the holders and thus enabling storing of broader holding rods between the holders or for example also coupling tabs which can be particularly broad portions of holding rods.

In a further embodiment, the at least one securing piece is fixable in at least two positions by means of the at least one lock, wherein one position is a closed position in which holding rods are vertically fixable inside the U-shaped deposition region by means of the at least one securing piece, and wherein a further position is an open position in which holding rods are vertically removable from or insertable into the U-shaped deposition region.

Advantageously, it can thus be ensured that in the closed position the holding rods cannot inadvertently be removed from the holding device or fall out of the same. In the open position, on the other hand, it can advantageously be ensured that there is no inadvertent blockage of the holding device by the securing piece, so that in the open position the holding device can easily be loaded with holding rods at any time. The securing piece thus serves as closure of the holding device, wherein the movable securing piece includes an axis of rotation integrated in the injection molded part, which due to the large number of pieces eliminates the relatively high mounting effort for screws, nuts and disks.

In a further example, there is provided at least one plastic insert with at least one tie-down strap for fixing the holding rods, wherein the plastic insert comprises at least one joining groove by means of which the plastic insert is positively connectable with the U-shaped deposition region of the holders, and wherein the at least one plastic insert can be screwed to at least one of the holders.

The plastic insert serves for the secure storage in particular of the CFRP holding rods, which can have various diameters. For this purpose, it can also be connected or screwed to both holders. Via the positive connection, the integrated joining grooves reinforce the connection between plastic insert and the holders of the holding device. The half-shell shape of the plastic insert offers a solid and careful support for the CFRP holding rods. At the same time, the tie-down strap prevents the lift-off of the holding rods during transport.

In a further exemplary embodiment, at least one rubber band is provided, which can be clamped between the at least two holders for vertically fixing the holding rods.

In this way, in particular coupling tabs which can be parts of holding rods, advantageously can be secured in lateral direction against lift-off and slipping out during transport or storage of the boom segments of the crane.

In a further embodiment, the at least two holders are identical.

It thereby advantageously is achieved that a particularly easy manufacture of the holders for example by an injection molding method is possible by using one and the same injection mold.

In a further embodiment, the at least two filler pieces are identical.

Here as well, the advantageously easy manufacturability of identical parts like the holder in the aforementioned example plays a decisive role.

In a further embodiment, the holders are connectable with each other and/or with the crane by means of screw connections.

In this present disclosure, connectors in the form of screw connections represent an advantageously simple, easily made type of connection between holding device and crane, which is practicable in construction site operation. In addition, the screw connections can easily be released with simple tools, so that the conditions or circumstances at the place of storage, in particular the type and width of the holding rods, can flexibly be dealt with.

In a further embodiment, the lock is formed as a spring cotter.

Such spring cotter represents an advantageously simple type of locking or fixing the holding device against inadvertent opening and closing or of positioning the securing piece, since utilizing the spring cotter does not require any additional tools and with a sufficient length of the spring cotter the holding device can be locked by means of the spring cotter in all its width settings.

Furthermore, the present disclosure relates to a filler piece with at least one toothed connecting surface and at least one lead-through designed as oblong hole for a holding device.

The present disclosure also relates to a plastic insert with at least one tie-down strap and at least one joining groove for a holding device.

The present disclosure furthermore relates to a set comprising a crane, at least one holding rod and a plurality of holding devices.

Further details and advantages of the present disclosure will now be explained in detail with reference to exemplary embodiments illustrated in the drawings.

BRIEF DESCRIPTION OF THE FIGURES

FIG. 1 shows a schematic representation of a crane in an oblique view.

FIG. 2a shows a holding device in a closed position.

FIG. 2b shows a holding device in an exploded representation.

FIG. 4a shows a holding device with holding rod in a closed position.

FIG. 4b shows holding rods mounted on a crane segment by means of holding devices.

FIG. 4c shows a coupling tab mounted by means of a holding device.

FIG. 5a shows a holding device with plastic insert.

FIG. 5b shows a holding device with plastic insert in an exploded representation.

FIG. 6 shows holding rods mounted on a crane segment by means of holding devices and plastic insert in a detail view.

DETAILED DESCRIPTION

Figure 3B:
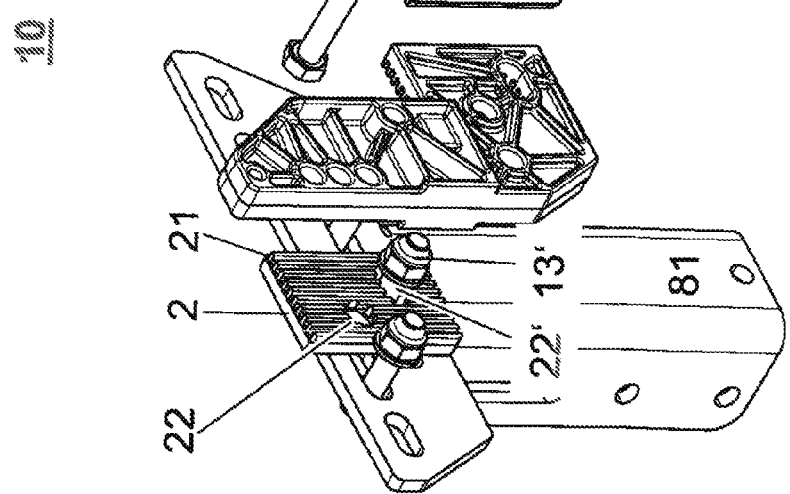
FIG. 3b shows a holding device with filler pieces in an exploded representation.

FIG. 1 shows a crane 80 in a fully equipped condition, in which the crane 80 can carry out crane work. The illustrated exemplary embodiment relates to a crawler crane with a lattice mast construction, which is stabilized by means of holding rods 90.

The problem underlying the present disclosure results from the fact that for example during transport of the crane 80 from one site to another, for which the crane 80 is disassembled, an expedient transport storage is necessary for the holding rods 90, which is effected automatically during the deposition operation.

FIG. 2a shows a holding device 10 in the assembled condition. This Figure initially shows the two holders 1, which via their toothed connecting surfaces 11 are positively connected with each other and serve for laterally securing the holding rods 90 on both sides. As compared to the prior art, the holders 1 are designed with enlarged supporting cross-sections.

Furthermore, a number of lead-throughs 12, 12' are shown, which are designed for accommodating various connecting means or connectors 13, 13' or also the lock 4. The connector may include any combination of a screw, a washer, and a nut. The lock 4 can be guided through lead-throughs 12 of the holders 1 and through lead-throughs 32 of the securing piece 3 for fixing the securing piece 3. In the illustrated embodiment, the two outer connecting means 13 provide for a connection of the entire holding device 10 to the crane 80. For this purpose, it is possible to vary the distance between the holders 1 corresponding to the toothed connecting surfaces 11, wherein the two holders 1 each include an oblong hole 12', whereby it is possible to lead connector 13' through the two oblong holes 12' for connecting the two holders 1 also in the case of differently spaced holders 1.

FIG. 2b shows the same exemplary embodiment of the holding device 10 as FIG. 2a, but in an exploded representation. What is shown more clearly here are the two oblong holes 12', which are provided in each toothed connecting surface 11 of the holders 1. The connectors, which in the illustrated embodiment is designed to include an arrangement of a screw, washers and a nut, either can connect a holder 1 with the crane 80, which in the illustrated embodiment is the case with the outer connector 13, or, as inner connector 13', connect the two holders 1 with each other and possibly furthermore with the crane 80. Depending on the holding rod size, the securing piece 3 can be connected with one of the holders 1 at different points via lead-throughs 12, which are designed as position bores, whereby the device is adjustable to different holding rod sizes.

Figure 3A:
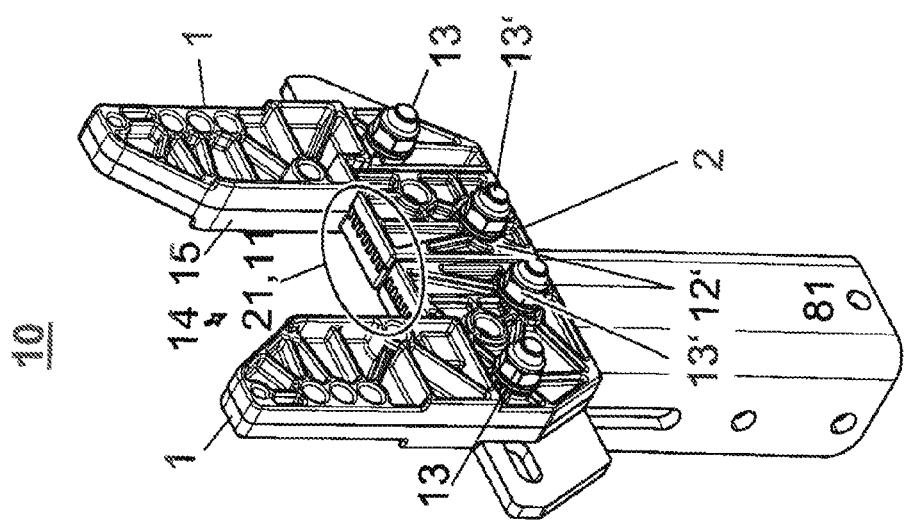
FIG. 3a shows a holding device with filler pieces in the attached condition.

FIG. 3a shows another embodiment of the holding device 10, wherein the holders 1 no longer are positively connected with each other directly via their toothed connecting surfaces 11. The holders 1 with filler pieces 2 rather are positively connected with each other via toothed connecting surfaces 11 of the holders 1 and toothed connecting surfaces 21 of the filler pieces 2. Holders 1, filler pieces 2 and all further parts of the holding device 10 for example can be made of CFRP or also GFRP (glass-fiber reinforced plastic), wherein other materials likewise are conceivable. The holding device 10 is connected with a bracket 81 of the crane 80 via a total of four connectors 13, 13', wherein the connectors 13' at the same time connect holders 1 with filler pieces 2.

In FIG. 3a, the U-shaped deposition region 14 is shown particularly clearly, which consists of vertical portions 15 of the holders 1 and a horizontal portion, wherein the horizontal portion comprises an upper region of the toothed connecting surfaces 11, 21. The particularly long vertical portion 15 of the holders 1 provides for a better hold of the holding rods 90 inside the U-shaped deposition region 14, especially when the holding device 10 is not in a horizontal position, but tilted. Thus, a complete support of the holding rods is ensured in every position.

In FIG. 3b, the exploded representation of the holding device 10 of FIG. 3a shows that each of the filler pieces 2, like also the holders 1, include a toothed connecting surface 21 and at least one oblong hole 22'. Analogous to the aforementioned direct connection of the holders 1 without filler pieces 2, differently spaced settings of the holders 1 and filler pieces 2 can be made by combining toothed connecting surfaces 11, 21 and oblong holes 12', 22'. That is, the toothed connecting surface of a holder can be combined with the toothed connecting surface of a filler piece and the oblong hole of a holder can be combined with the oblong hole of a filler piece. Thus, the embodiment with filler pieces 2 also can comprise variably spaceable holders 1.

FIG. 4a shows a holding device 10 which is mounted on a bracket 81 and holds a holding rod 90. The securing piece 3 is in a closed position and is fixed by the lock 4 such that the holding rod 90 is prevented from breaking out from the holding device 10 in a vertical direction, i.e. towards the top. FIG. 4a shows an enlarged segment "I", whose position in the crane structure is described in detail in FIG. 4b. In contrast to FIG. 4c, FIG. 4a shows a portion of a holding rod 90 which is sufficiently small, so that the holding device 10 is employed in its narrow embodiment without filler pieces 2.

The enlarged segment "II" shown in FIG. 4c shows a region in which a particularly broad portion of a holding rod 90 is held by a holding device 10. The broad region of the holding rod 90 can be a coupling tab connection 91, which is suitable for connecting or coupling various holding rod portions. To be able to hold this relatively broad coupling tab 91 with the holding device 10, the holding device 10 is mounted on a bracket 81 of the crane 80 in a broader embodiment with filler pieces 2 as shown in FIGS. 3a and 3b. The coupling tab 91 then easily rests inside the U-shaped deposition region 14 of the holding device 10 and can be fixed in lateral position during the transport of the boom elements by means of the non-illustrated rubber band for securing against lift-off and slipping out.

FIG. 5a shows an embodiment of the holding device 10, in which both filler pieces 2 and a plastic insert 5 with a tie-down strap 6 are provided. The plastic insert 5 provides for securely storing in particular CFRP holding rods with various diameters and for preventing the holding rods 90 from breaking out of the holding device 10 by means of the tie-down strap 6. In the exploded representation of FIG. 5b, the plastic insert 5 includes visible lead-throughs 52, by means of which the plastic insert 5 is connectable with the holders 1. For a better connection of the plastic insert 5, joining grooves 54 are provided at the same, via which the plastic insert 5 can enter into positive connection with the holders 1 and possibly the filler pieces 2. For this purpose, the plastic insert 5 is inserted into the U-shaped deposition region 14 of the holders 1 and fixed with connecting means 53.

The tie-down strap 6 is formed such that it can be opened and closed without an additional tool, for example by means of a buckle device 63. This ensures an easy handling of the device.

FIG. 6 finally shows a crane portion ready for transport, on which holding devices 10 are provided in various embodiments for holding different holding rods 90 or different portions of the holding rods 90 at a lattice mast boom element. In the detail view "III", a CFRP holding rod is fixed at the crane portion by means of a holding device 10 with plastic insert 5.

Further commonly used holding rods 90 as well as coupling tab connections 91 likewise are fixed in a corresponding storage position by means of holding devices 10. It becomes clear that by means of a holding device 10 in its different exemplary embodiments a wide variety of holding rod geometries can be fixed at crane portions.

In another example, a system is provided, comprising: a holding device for storing holding rods on a crane, the holding device including: two holders, each holder comprising a first toothed connecting surface, a first group of oblong lead-throughs, and a second group of oblong lead-throughs; a securing piece; a lock; and a connector for connecting each of the two holders with each other via respective first group of oblong lead-throughs; two filler pieces, each filler piece with a second toothed connecting surface, a third group of oblong lead-throughs and a fourth group of oblong lead-throughs; and a holding rod, wherein the two holders are further connectable with a crane through respective second group of oblong lead-throughs, wherein when combined, the two holders together comprise a common U-shaped deposition region for accommodating and horizontally fixing the holding rod, and wherein the holding rod is vertically fixable inside the U-shaped deposition region via the securing piece and the lock. In one example, the two holders are coupled only via the toothed connecting surfaces and the connector coupling the oblong lead-throughs. In another example, the two holders are further coupled via the filler pieces. The holders are coupled to the crane only via the oblong lead-throughs and not the toothed connecting surfaces. One of the two filler pieces is brought in positive connection with one of the holders via the first toothed connecting surface of the holder interacting with the second toothed connecting surface of the filler piece, wherein the first group of oblong lead-throughs of the holder at least partially overlaps the third group of oblong lead-throughs of the filler piece, and the second group of oblong lead-throughs of the holder at least partially overlaps the fourth group of oblong lead-throughs of the filler piece, and wherein the two holders and the two filler pieces are connectable with each other and/or with the crane by a total of at least four oblong lead-throughs. In one example, the holding device is coupled to the crane only via four lead-throughs including two oblong lead-throughs of the holders coupled directly to the crane and two oblong lead-throughs of the holder coupled to the crane via the filler pieces. The connector includes one or more of a screw, a nut, and a washer, the system further comprising a plastic insert including a tie-down strap for fixing the holding rods and at least one joining for positively connecting the plastic insert with the U-shaped deposition region of the holders. Further, the plastic insert is coupled to at least one of the holders via a screw.

In another example, a system, comprises: one or more holding devices for storing holding rods on a crane, each of the one or more holding devices including: two holders, each holder comprising a first toothed connecting surface, a first oblong lead-through, and a second oblong lead-through; a securing piece; a lock; and a connector for connecting each of the two holders with each other via respective first oblong lead-throughs; two filler pieces, each filler piece including a second toothed connecting surface, a third oblong lead-through and a fourth oblong lead-through, wherein one of the two filler pieces is positively connectable to one of the two holders via the first toothed connecting surface of the holder interacting only with the second toothed connecting surface of the filler piece; a plastic insert including a tie-down strap and a joining groove; and a holding rod, wherein the two holders are further connectable with a crane through respective second oblong lead-throughs, wherein when combined, the two holders together comprise a common U-shaped deposition region for accommodating and horizontally fixing the holding rod, and wherein the holding rod is vertically fixable inside the U-shaped deposition region only via the securing piece and the lock. The system further comprises a rubber band, the rubber band clamped only between the two holders for vertically fixing the holding rod. In one example, the two holders are identical, and the two filler pieces are identical. In one example, the lock is formed as a spring cotter. The first oblong lead-through of the holder may at least partially overlap the third oblong lead-through of the filler piece, and the second oblong lead-through of the holder may at least partially overlap the fourth oblong lead-through of the filler piece. Further, the two holders and the two filler pieces are connectable with each other and/or with the crane by the four oblong lead-throughs. For example, a connector may pass through the first and second lead-throughs of the holder. In another example, a connector may pass through the first and third lead-throughs, and another connector may pass through the second and fourth lead-throughs, thereby coupling the holder to the crane via the filler piece.

The invention claimed is:

1. A holding device for storing holding rods on a crane, comprising:
   at least two holders;
   optionally at least one securing piece;
   optionally at least one lock;
   wherein the at least two holders each comprise at least one toothed connecting surface and a plurality of lead-throughs, at least one of the plurality of lead-throughs is designed as an oblong hole, wherein each of the at least two holders are connectable with each other via a connector through respective oblong holes and are each connectable with the crane through at least one further lead-through, wherein the at least two holders together comprise a common U-shaped deposition region for accommodating and horizontally fixing the holding rods, and wherein the holding rods optionally are vertically fixable inside the U-shaped deposition region by means of the at least one securing piece and the at least one lock.

2. The holding device according to claim 1, wherein the at least two holders are each brought in positive connection with each other via the at least one toothed connecting surface, and wherein the oblong holes of the at least two holders at least partly overlap each other.

3. The holding device according to claim 1, wherein the oblong hole of each of the at least two holders is provided in a region of the at least one toothed connecting surface.

4. The holding device according to claim 1, further comprising at least two filler pieces each with at least one toothed connecting surface and at least one lead-through, each of the at least one lead-through of the filler pieces designed as an oblong hole, wherein each of the at least two filler pieces can be brought in positive connection with each of the at least two holders via the at least one toothed connecting surface of the holders and the at least one toothed connecting surface of the filler pieces, wherein the oblong holes of the holders and the oblong holes of the filler pieces at least partly overlap each other, and wherein a total of at least two holders and at least two filler pieces are connectable with each other and/or with the crane by a total of at least four lead-throughs.

5. The holding device according to claim 4, wherein the at least two filler pieces are identical.

6. The holding device according to claim 1, wherein the at least one securing piece is fixable in at least two positions by means of the at least one lock, wherein one position is a closed position in which holding rods are vertically fixable inside the U-shaped deposition region by means of the at least one securing piece, and wherein a further position is an open position in which holding rods are vertically removable from or insertable into the U-shaped deposition region.

7. The holding device according to claim 1, further comprising at least one plastic insert with at least one tie-down strap for fixing the holding rods, wherein the at least one plastic insert comprises at least one joining groove by means of which the at least one plastic insert is positively connectable with the U-shaped deposition region of the holders, and wherein the at least one plastic insert can be screwed to at least one of the holders.

8. The holding device according to claim 1, further comprising at least one rubber band which can be clamped between the at least two holders for vertically fixing the holding rods.

9. The holding device according to claim 1, wherein the at least two holders are identical.

10. The holding device according to claim 1, wherein the connector includes screw connections.

11. The holding device according claim 1, wherein the lock is formed as a spring cotter.

12. A system, comprising:
   a holding device for storing holding rods on a crane, the holding device including:
      two holders, each holder comprising a first toothed connecting surface, a first group of oblong lead-throughs, and a second group of oblong lead-throughs;
      a securing piece;
      a lock; and
      a connector for connecting each of the two holders with each other via the first group of oblong lead-throughs;
   two filler pieces, each filler piece with a second toothed connecting surface, a third group of oblong lead-throughs and a fourth group of oblong lead-throughs; and
   a holding rod, wherein the two holders are further connectable with a crane through the second group of oblong lead-throughs, wherein when combined, the two holders together comprise a common U-shaped deposition region for accommodating and horizontally fixing the holding rod, and wherein the holding rod is vertically fixable inside the U-shaped deposition region via the securing piece and the lock.

13. The system of claim 12, wherein one of the two filler pieces is brought in positive connection with one of the holders via the first toothed connecting surface of the holder interacting with the second toothed connecting surface of the filler piece, wherein the first group of oblong lead-throughs of the holder at least partially overlaps the third group of oblong lead-throughs of the filler piece, and the second group of oblong lead-throughs of the holder at least partially overlaps the fourth group of oblong lead-throughs of the filler piece, and wherein the two holders and the two filler pieces are connectable with each other and/or with the crane by a total of at least four oblong lead-throughs.

14. The system of claim 13, wherein the connector includes one or more of a screw, a nut, and a washer, the system further comprising a plastic insert including a tie-down strap for fixing the holding rods and at least one joining groove for positively connecting the plastic insert with the U-shaped deposition region of the holders.

15. The system of claim 14, wherein the plastic insert is coupled to at least one of the holders via a screw.

16. A system, comprising:
one or more holding devices for storing holding rods on a crane, each of the one or more holding devices including:
two holders, each holder comprising a first toothed connecting surface, a first oblong lead-through, and a second oblong lead-through;
a securing piece;
a lock; and
a connector for connecting each of the two holders with each other via the first oblong lead-throughs;
two filler pieces, each filler piece including a second toothed connecting surface, a third oblong lead-through and a fourth oblong lead-through, wherein one of the two filler pieces is positively connectable to one of the two holders via the first toothed connecting surface of the holder interacting with the second toothed connecting surface of the filler piece;
a plastic insert including a tie-down strap and a joining groove; and
a holding rod, wherein the two holders are further connectable with a crane through the second oblong lead-throughs, wherein when combined, the two holders together comprise a common U-shaped deposition region for accommodating and horizontally fixing the holding rod, and wherein the holding rod is vertically fixable inside the U-shaped deposition region via the securing piece and the lock.

17. The system of claim 16, further comprising a rubber band, the rubber band clamped between the two holders for vertically fixing the holding rod.

18. The system of claim 16, wherein the two holders are identical, and wherein the two filler pieces are identical.

19. The system of claim 16, wherein the lock is formed as a spring cotter.

20. The system of claim 16, wherein the first oblong lead-through of the holder at least partially overlaps the third oblong lead-through of the filler piece, and the second oblong lead-through of the holder at least partially overlaps the fourth oblong lead-through of the filler piece, and wherein the two holders and the two filler pieces are connectable with each other and/or with the crane by the four oblong lead-throughs.

* * * * *